(12) United States Patent
McMahon

(10) Patent No.: US 8,784,665 B1
(45) Date of Patent: Jul. 22, 2014

(54) METHOD FOR REDUCING ODOR AND HARMFUL MATERIALS FROM SEWER PLANT PROCESS STREAMS

(76) Inventor: Geoff McMahon, Farmington, NM (US)

( * ) Notice: Subject to any disclaimer, the term of this patent is extended or adjusted under 35 U.S.C. 154(b) by 0 days.

(21) Appl. No.: 13/542,167

(22) Filed: Jul. 5, 2012

Related U.S. Application Data

(63) Continuation-in-part of application No. 13/084,976, filed on Apr. 12, 2011, now abandoned.

(51) Int. Cl.
*B01D 15/20* (2006.01)
*C05F 11/02* (2006.01)

(52) U.S. Cl.
USPC .............................. 210/660; 71/24; 210/680

(58) Field of Classification Search
USPC ................................ 210/660–808
See application file for complete search history.

(56) References Cited

U.S. PATENT DOCUMENTS

| | | |
|---|---|---|
| 2,027,766 A | 1/1936 | Davis et al. |
| 2,992,093 A | 7/1961 | Burdick |
| 3,111,404 A | 11/1963 | Karcher et al. |
| 3,321,296 A | 5/1967 | Abbe et al. |
| 3,398,186 A | 8/1968 | Schwartz |
| 3,418,100 A | 12/1968 | Cooley et al. |
| 3,544,296 A | 12/1970 | Karcher |
| 3,630,710 A | 12/1971 | Frederickson |
| 3,770,411 A | 11/1973 | Chambers et al. |
| 3,872,002 A * | 3/1975 | Musgrove ................. 210/711 |
| 3,985,536 A | 10/1976 | Abbe et al. |
| 4,069,034 A | 1/1978 | Hoover |
| 4,319,041 A | 3/1982 | Goff |
| 4,425,149 A | 1/1984 | Kimbro |
| 4,459,149 A | 7/1984 | Moran et al. |
| 4,778,602 A | 10/1988 | Allen, III |
| 4,786,307 A | 11/1988 | Marihart |
| 4,861,481 A | 8/1989 | Allen, III |
| 5,112,501 A * | 5/1992 | Rausa et al. ................. 210/730 |
| 5,178,661 A | 1/1993 | van der Watt et al. |
| 5,451,240 A | 9/1995 | Trowbrdige |
| 5,466,273 A | 11/1995 | Connell |
| 5,997,749 A * | 12/1999 | Citterbart et al. ............ 210/688 |
| 6,080,220 A | 6/2000 | Sequi et al. |
| 6,147,229 A | 11/2000 | Rasmussen et al. |
| 6,204,396 B1 | 3/2001 | Rasmussen et al. |
| 6,461,399 B1 | 10/2002 | Connell |
| 6,471,741 B1 | 10/2002 | Reinbergen |
| 6,478,946 B1 | 11/2002 | Westwood |
| 6,695,892 B1 | 2/2004 | Fischer et al. |
| 6,696,577 B1 | 2/2004 | Westwood |
| 2002/0124613 A1 | 9/2002 | Sower |
| 2002/0174697 A1 | 11/2002 | Reid et al. |
| 2004/0065127 A1 | 4/2004 | Connell |
| 2007/0051148 A1 | 3/2007 | Terenzio |
| 2008/0121006 A1 | 5/2008 | Prasad |
| 2010/0077816 A1 | 4/2010 | Prasad |
| 2011/0237438 A1 | 9/2011 | Marihart |
| 2011/0286799 A1 | 11/2011 | de al Garza et al. |

FOREIGN PATENT DOCUMENTS

| | | |
|---|---|---|
| EM | 0561508 | 9/1993 |
| EP | 000117223 A1 | 8/1984 |
| FR | 2896435 * | 1/2006 |
| KR | 2002-0042013 | 6/2002 |

* cited by examiner

*Primary Examiner* — Wayne Langel
(74) *Attorney, Agent, or Firm* — Jeffrey D. Myers; Peacock Myers, P.C.

(57) ABSTRACT

The present invention provides methods for reducing odor and harmful materials, such as heavy metals and organic compounds, from sewer and/or industrial plants using humate and/or leonardite. The humate and/or leonardite has a particle size of about 400 mesh or less.

5 Claims, No Drawings

METHOD FOR REDUCING ODOR AND HARMFUL MATERIALS FROM SEWER PLANT PROCESS STREAMS

CROSS-REFERENCE TO RELATED APPLICATIONS

This application is a continuation-in-part application of U.S. patent application Ser. No. 13/084,976, entitled "A Method for Solubilizing Leonardite", to Geoff McMahon, filed on Apr. 12, 2011, and the specification and claims thereof are incorporated herein by reference.

This application is related to U.S. patent application Ser. No. 12/905,284, entitled "Extraction of Fulvic Minerals, Vitamins, Amino Acids, Enzymes, and Phytonutrients from Humic Substances", to Geoff McMahon, filed on Oct. 15, 2010, which is a continuation-in-part application of U.S. patent application Ser. No. 11/155,449, entitled "Extraction of Fulvic Minerals from Humic Substances", to Geoff McMahon, filed on Jun. 15, 2005, and the specifications and claims thereof are incorporated herein by reference.

BACKGROUND OF THE INVENTION

1. Field of the Invention (Technical Field)

The present invention relates to a method for solubilizing leonardite deposits.

2. Description of Related Art

Leonardite is a mineral-like substance that is rich in humic substances. Humic substances, hereinafter also referred to collectively as humic material, are characterized as high molecular weight heterogeneous organic substances that are the components of soils and sediments. Specifically, they are the compounds of which humus is comprised. They are widespread and generally found in areas where there has been dense prehistoric plant growth. They are understood to play an important role in many geo-chemical reactions and processes including the transport of metal ions, contribution to the cation and anion exchange capacity of peat, soil, and water, the water holding capacity of soil, and the binding of various organic molecules.

Because they play a vital role in soil ecosystems, humic substances are considered to be necessary constituents of soil, both for healthy plant growth and for the nutrition of livestock. The practice of agriculture, however, depletes soils of nutrients. It is generally believed that there is widespread mineral nutrient depletion in farm and range soils. Consequently, humic substances are introduced to agricultural soils as soil nutrient improvement.

In recognition that humic substances are superior soil nutrient providers, there is an interest in the direct application of some of these substances to plants, and of feeding these to animals. Also, the vitamin and mineral supplement industry is utilizing these substances to supplement human diets that are believed to be deficient in these substances because of their increasingly diminishing concentrations in produce.

Several components of humic substances are believed to be especially beneficial. Some of these components include humic acid, fulvic minerals, vitamins, amino acids, enzymes, and phytonutrients. These are operationally defined in terms of their solubility. Humic acid is the fraction of humic substances that is not soluble in water under acidic conditions but is soluble in water under alkaline conditions. Fulvic minerals comprise the fraction of humic substances that are soluble under all pH conditions.

It is believed that because fulvic minerals, vitamins, amino acids, enzymes, and phytonutrients molecules are of a relatively small size, they are more readily absorbed by plants and can carry trace minerals from plant surfaces into plant tissues. Therefore, fulvic minerals, vitamins, amino acids, enzymes, and phytonutrients may be sprayed onto plants to maximize the productive capacity of plants. Fulvic minerals, vitamins, amino acids, enzymes, and phytonutrients also benefit humans and can be taken orally in liquid form, or can be applied directly to the skin.

However, the methods currently employed for extracting fulvic minerals, vitamins, amino acids, enzymes, and phytonutrients from the other humic substances result in liquids with high pH containing such compounds as phosphoric acid or sulfuric acid. One method, for example, comprises the addition of phosphoric acid or sulfuric acid to a humic substance material in water. A method is needed to extract fulvic minerals, vitamins, amino acids, enzymes, and phytonutrients in a solution that can be safely consumed by humans and animals and/or sprayed on foliage.

BRIEF SUMMARY OF THE INVENTION

One embodiment of the present invention comprises a method of solubilizing leonardite. This method preferably comprises micronizing the leonardite, placing the leonardite in a rotating drum, pressurizing the drum, rotating the drum, introducing gas into the drum, reacting the leonardite with the gas as the drum is rotated, and removing the solubilized leonardite from the drum. The gas in this embodiment can comprise ammonia. The drum preferably has a tilted axis and/or baffles. The baffles are optionally internal spiral ribs. This method does not require liquification and does not require drying. The solubilized leonardite can be mixed with water. The solubilized leonardite is preferably approximately 50 to 95 percent soluble and more preferably 70 to 95 percent soluble.

A solubilized leonardite is preferably manufactured according to the method above. A composition comprising the solubilized leonardite is preferably manufactured according to the method above.

Another embodiment of the present invention comprises a process for treating a sewer stream. The process comprises passing a flow of the sewer stream through leonardite. The leonardite preferably comprises a particle size of less than about 400 mesh. The leonardite is used to treat the flow of the sewer stream at a rate of about one pound of leonardite to about 10,000 gallons of sewer. The leonardite can comprise a powdered form, a granular form and/or a liquid form. The sewer solids and the leonardite can be separated out via coagulation and/or flocculation after the sewer stream has been treated with leonardite. The separated sewer solids and/or the leonardite are then disposed.

Another embodiment of the present invention comprises a process for treating a sewer stream comprising passing a flow of the sewer stream through a humate, said humate comprising a particle size of less than about 400 mesh. The humate is used to treat the flow of the sewer stream at a rate of about one pound of the humate to about 10,000 gallons of sewer. The humate can comprise a powdered form, a granular form and/or a liquid form. The sewer solids and the humate can be separated out via coagulation and/or flocculation after the sewer stream has been treated with humate. The separated solids and/or humate are then disposed.

Other objects, advantages and novel features, and further scope of applicability of the present invention are set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

Leonardite is defined as a mineral-like substance that is rich in humic material or humate.

Humic material or humate is defined as high molecular weight heterogeneous organic substances that are the components of soils and sediments.

Humic material or humate is typically buried approximately six inches to approximately thirty feet beneath the surface of the ground. In order to reach the humic material, the top surface of the ground is removed, and the humic material is mined. The humic material is removed from the ground, milled, crushed, separated by particle size, dried, and finally micronized. The micronizing process grounds the humic material to a power-like consistency with a small particle size. After micronizing, the humic material is preferably 400 mesh or less in particle size (or about 40 microns or less). Once the humic material is micronized, it is ready for extraction.

One embodiment of the present invention provides a method for extracting fulvic minerals, vitamins, amino acids, enzymes, and phytonutrients from complexes of humic substances. In the preferred embodiment of the invention, a complex of humic substances, or humic substances material, is placed in an aqueous solution, preferably utilizing water. The pH of the solution is then increased.

In another embodiment of the present invention, the pH is increased to between approximately 8.0 and 14.0, more preferably from between approximately 8.5 and 14.5, still more preferably from between approximately 9.0 and 14.0, and most preferably between approximately 10.0 and 14.0. Preferably, this is accomplished by the addition of calcium hydroxide. In another embodiment, lime may be utilized. In still another embodiment, magnesium hydroxide may be introduced together with the calcium hydroxide.

When the desired pH is reached, the solution is allowed to sit preferably undisturbed in a still state with no mixing, stirring, or agitating. In other words, the pH is allowed to drop naturally over time without any disturbance to the solution such as, for example, mixing, adding reagents or other materials, or changing the temperature or stirring. While the pH of the solution is dropping naturally over time, it is preferred that no other material, solution, component, reagent, liquid, acid, base, solid or the like is added to the solution. When the pH drops, the supernatant is removed. Preferably, the supernatant is removed when a pH of between approximately 5.5 and 8.5 is reached, more preferably when a pH of between approximately 6.5 and 9.0 is reached. The supernatant comprises the fulvic mineral, vitamin, amino acid, enzyme, and phytonutrient fraction in solution with calcium hydroxide. The fraction solution may then be safely consumed or applied to foliage.

The present invention not only provides for the separation fulvic minerals, vitamins, amino acids, enzymes, and phytonutrients from the other humic substances material compounds, but also provides for the presence of essential nutrients, such as, but not limited to, calcium and magnesium (if magnesium hydroxide is utilized), in the resulting product.

The amino acids recovered from the extraction can include, but are not limited to: alanine, glutamic acid, glycine, histidine, isoleucine, methionine, phenylalanine, serine, threonine, tryptophan, and valine.

The vitamins recovered from the extraction can include, but are not limited to: cyanocobalamin (B12), niacin (B3), calciferol (D2), phylloquinone (K), retinol and/or beta carotene (A), thiamine (B1), tocopherol (E), riboflavin (B2), and pyridoxine (B6).

The phytonutrients recovered from the extraction can include but are not limited to: chlorophyll, allyl sulfides, quercetin, limonene, lutein, catehin, sulphoraphane, lycopene, ellagic acid, resveratrol, and anthocyanins. Many different types of enzymes are also extracted.

The composition of fulvic minerals, vitamins, amino acids, enzymes, and phytonutrients are generally suitable for external use, oral consumption, infusion, or intravenous use. The applications and effects of the composition for internal use include, but are not limited to: the increase of hemoglobin oxygen levels; the improvement of cardio function; treatment for cancer; the decrease in recovery time following chemotherapy and the amelioration or prevention of the side effects of chemotherapy; the detoxification of heavy metals and other toxins from the body; the shrinkage of tumors; the curing of hemophilia, the increase of energy levels in the body; the carriage/delivery of medications; the aid of recovery form Hepatitis C; the cessation of nose bleeds; the remedy of migraine headaches; the improvement of the immune system; and the reduction of arthritis pain. The applications and effects of the composition for internal use include, but are not limited to: the healing of cuts, abrasions, and burns; the moisturizing of the skin; the reduction of scarring; the prevention of infections; the moisturizing of dry sinuses; the improvement from sinus infections; the analgesic effect for skin irritation; and the treatment of tinea infections.

Method of Solubilizing Leonardite Deposits

Many leonardite deposits contain a full range of minerals, amino acids, phytonutrients, vitamins and enzymes, as verified by laboratory tests, but they are typically insoluble in water. Previously, in order to render the material water-soluble, the leonardite is first treated with liquid sodium hydroxide or potassium hydroxide to make the components of the leonardite water soluble; then, if it becomes necessary to dehydrate the mixture into a powdered form, it must first be dried or freeze-dried, which is time-consuming and costly. Because the volume and weight of the conventional water-soluble mixture presents a transport problem to get it on-site where it is needed, it seems most reasonable that if the dry material can be made water soluble in the first place, the volume and weight are both considerably reduced, making it faster, less expensive and user-friendly than the typical liquefied product produced by conventional means.

Many of the existing systems and methods use liquids instead of powder, making them bulky, heavy, and requiring tank storage. The liquid makes the product more difficult to transport and increases costs. The product in liquid form presents a problem of storage container corrosion, whereas embodiments of the present invention allow the product to be stored and/or transported without similar problems that corrosive liquids present. Many other clean-up type products are toxic. However, the powder of embodiments of the present invention is preferably non-toxic, light-weight and can be used as a fertilizer.

Embodiments of the present invention make leonardite deposits soluble while still remaining a dry powder, thereby eliminating any intermediate treatment and/or drying steps. Using the methods of embodiments of the present invention, the dry powder remains a dry powder but is rendered water-soluble and can be hydrated on-site by just adding water, which can generally be easily and quickly obtained from or near the site where it is needed.

One embodiment of the present invention preferably comprises the following steps;
1. Micronize the leonardite,
2. Place the micronized leonardite into a pressure-tight rotating vessel or drum, whose axis is preferably tilted. The rotating drum preferably comprises baffles, more preferably internal spiral ribs that continually lift the material from the lower end and mix the material, allowing complete and thorough contact of a gas with the material, ensuring an even and complete activation of the product.
3. Introduce a gas into the drum, preferably gaseous ammonia anhydride and place the drum under pressure and rotate the drum. A chemical reaction takes place between the gas and the micronized leonardite material. As the reaction is completing, additional pressure builds in the drum, as well as a small amount of heat produced by the activation. After activation is completed, the product can be removed from the drum and is soluble in water with no nutrients altered or destroyed, and no intermediate liquification step being necessary, as the powder remains a powder and is water-soluble after activation.
4. Transporting of the water-soluble powder is much more convenient, less expensive and faster than using any other conventional means of treatment/activation.

In another embodiment of the present invention, leonardite is preferably micronized before activating. Gaseous ammonia is introduced into the rotating drum under pressure to get the proper activation reaction which renders the leonardite material into a water-soluble powder with all the original nutrients, minerals, phytonutrients, vitamins and enzymes intact and not degraded. With this embodiment of the present invention, no intermediate liquification and subsequent drying is necessary to get the same end result as by conventional means. When gaseous ammonia is introduced under pressure into a rotating drum, the ammonia preferably becomes rapidly and completely mixed with the micronized leonardite particles, ensuring a rapid and thorough contact and activation.

In an embodiment of the present invention, the method and process is performed, implemented and executed using two machines or computerized machines (a micronizer to produce a fine powder and a rotating drum to ensure a thorough and complete activation). This process can optionally be performed using a motorized, sealable drum capable of withstanding the necessary operating pressure, able to rotate at an adjustable rate, and manufactured using components and materials suitable for resisting corrosion. Embodiments of the present invention can be used to manufacture plant nutrients as well as animal nutrients, or as a nutrient for algae and other microorganisms.

As explained in the example below, embodiments of the present invention can be used to clean up oil spills by encouraging the growth and multiplication of the natural organisms found in soil or water. The treated leonardite material encourages the growth of microorganisms, digests oil and breaks it down into water, carbon dioxide and methane. After breaking down the oil, the remaining compounds serve as a plant nutrient mite. Since oil spills occur on land, oceans, lakes and streams, they create havoc wherever they occur, and my process creates a product that is safe, light-weight, easily transported, and cleans spills by natural means rather than introducing harmful elements into the soil or water. This product is dry and can be mixed on-site with water to clean up spills using non-chemical means which are non-toxic and not harmful to plants or animals.

One embodiment of the present invention comprises a method of reducing and/or eliminating toxic and environmentally noxious materials from discharges into and/or out of industrial and sewer plants by adding leonardite and/or humate in various forms to one or more process streams. As little as one pound of leonardite and/or humate per ten thousand (10,000) gallons of process stream can be used to eliminate toxic and environmentally noxious materials from a process stream. The leonardite and/or humate is preferably a powder-like consistency with a small particle size. The leonardite and/or humate is preferably micronized and is preferably about 400 mesh or less in particle size (or about 40 microns or less in particle size). This small particle size provides for greater absorption ability and is easier for clean-up, than larger sized humate.

Many industrial sewer plants have various substances in the process which need to be eliminated from the stream before discharge into the environment including odors; heavy metals and organic compounds. The addition of leonardite and or humate can absorb and thereby eliminate odor, many heavy metals and organic compounds from the process stream. Humate and/or leonardite will absorb various toxic metals in solution, including but not limited to chromium, vanadium, lean, copper, zinc, arsenic, mercury and cadmium. Waste water plants currently have methods for separating out the suspended solids from the water, but these methods do not remove a sufficient amount of the dissolved toxic elements and metals from the liquid during the removal and separation of the suspended solids.

An embodiment of the present invention comprises a method comprising adding leonardite and/or humate in one or more forms to a process stream. The forms of humate and/or leonardite can be, but are not limited to, a fine ground power, a porous bed of humate and/or leonardite through which the sewer stream passes, and a liquid when humate and/or leonardite is liquefied by the addition of potassium hydroxide. The solids, including the humate and/or leonardite with attached heavy metals and toxins can be separated out via traditional methods including but not limited to coagulation and flocculation. The benefit of adding humate and/or leonardite is that it removes the toxic metals and elements that normally end up in the water discharged into the environment using traditional solids-separation methods.

Traditionally, after separation using coagulating methods, the resulting sludge is run through a belt press or centrifuge to remove as much liquid as possible and deliver a dry cake that is disposed of in authorized disposal sites. Using humate and/or leonardite, the dry cake now contains the toxic materials removed from the liquid as well as the normal suspended solids.

Adding the humate and/or leonardite is preferably done early in the process. For example, the humate and/or leonardite can be mixed with the coagulant and influent water as it enters the plant. Alternatively, the humate and/or leonardite can be inserted into the influent water as it is being aerated and before the solids separation process has begun. The humate and/or leonardite is preferably added before the sludge concentration process begins. Many or most noxious odors are thus eliminated early in the process. Most odors associated with ammonia, produced in normal waste water treatment, are eliminated by the humate and/or leonardite as it absorbs ammonia within seconds. Other sulfide-based gases are reduced or eliminated by absorption by the humate and/or leonardite. The bulk of heavy metals traveling in the process stream are absorbed and/or adsorbed by the humate and/or leonardite. Many of the organic compounds in the process stream are neutralized and deposited with the solids. The humate and/or leonardite containing the noxious and/or toxic compounds can be separated from the liquids of the process stream by conventional means and can be disposed of in any matter known in the art.

EXAMPLE

Oil Dissolver

Leonardite deposits and/or fulvic minerals can also be used to dissolve and breakdown oil, for example, after an oil spill. One embodiment of the present invention comprises a method of dissolving and breaking down oil, such as oil from an oil spill. In this embodiment, leonardite deposit is treated with a gas, preferably ammonia gas, under pressure of approximately 1 to 50 psi from about 2 hours to about 5 hours. The leonardite deposit is agitated or rotated while being treated with a gas for approximately 2 to approximately 5 hours. The leonardite deposit ends up as a dried power and is easily transported. After treatment with a gas, the leonardite deposit is approximately 50-95% soluble in water, and more preferably 70-95% soluble in water. The leonardite deposit is mixed with water at a ratio of approximately 1 pound of leonardite to approximately 300 pounds of water to 1 pound of leonardite to approximately 1 pound of water. The leonardite deposit solution is then sprayed, poured or dumped on an oil slick. Within two to three days the oil is gone. The solution promotes growth and reproduction of microorganisms and converts the oil to methane and carbon dioxide. The solution can also be used as a fertilizer on crops to improve yields of crops.

Example

Extracts of fulvic minerals, vitamins, amino acids, enzymes, and phytonutrients were obtained using the methods of the present invention. The extract proved safe for animal and human consumption and contained calcium and magnesium as a consequence of the methods of extraction.

The preceding example can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above, and of the corresponding application(s), are hereby incorporated by reference.

What is claimed is:

1. A process for treating a sewer stream comprising passing a flow of the sewer stream through leonardite, said leonardite comprising a particle size of about 400 mesh or less and having been reacted with gaseous ammonia so as to render the leonardite into a water-soluble powder.

2. The process of claim 1 wherein the leonardite is used to treat the flow of the sewer stream at a rate of about one pound of leonardite to about 10,000 gallons of sewer.

3. The process of claim 1 further comprising separating out sewer solids and the leonardite via coagulation after the sewer stream has been treated with the leonardite.

4. The process of claim 3 further comprising disposing of the separated out sewer solids and the leonardite.

5. The process of claim 1 further comprising separating out sewer solids and the leonardite via flocculation after the sewer stream has been treated with the leonardite.

* * * * *